United States Patent
Vanninen et al.

(10) Patent No.: US 8,156,290 B1
(45) Date of Patent: Apr. 10, 2012

(54) JUST-IN-TIME CONTINUOUS SEGMENT CLEANING

(75) Inventors: Matti Vanninen, Raleigh, NC (US); Rickard E. Faith, Hillsborough, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 450 days.

(21) Appl. No.: 12/429,108

(22) Filed: Apr. 23, 2009

(51) Int. Cl.
*G06F 13/00* (2006.01)
(52) U.S. Cl. .......................... 711/154; 711/213; 711/217
(58) Field of Classification Search .................. 711/154, 711/213, 218, 217, 219, 220
See application file for complete search history.

(56) References Cited

U.S. PATENT DOCUMENTS

| | | | |
|---|---|---|---|
| 5,530,958 A | 6/1996 | Agarwal et al. |
| 5,897,661 A | 4/1999 | Baranovsky et al. |
| 6,253,285 B1 | 6/2001 | Razdan et al. |
| 6,571,261 B1 | 5/2003 | Wang-Knop et al. |
| 6,578,131 B1 | 6/2003 | Larson et al. |
| 6,629,198 B2 | 9/2003 | Howard et al. |
| 6,978,283 B1 | 12/2005 | Edwards et al. |
| 7,139,863 B1 | 11/2006 | Defouw et al. |
| 7,702,870 B2 * | 4/2010 | English et al. ................. 711/165 |
| 2005/0027735 A1 | 2/2005 | Cabrera et al. |
| 2005/0149586 A1 | 7/2005 | Lange et al. |
| 2005/0187985 A1 | 8/2005 | Edwards et al. |
| 2007/0168633 A1 | 7/2007 | English et al. |

OTHER PUBLICATIONS

Network Appliance, "FlexVol and FlexClone Software", Storage Solutions, Oct. 29, 2004, 2 pages.
Michael Fisch, "NetApp FlexVol and FlexClone Raise the Rate of Return on Storage Resources", The Clipper Group Navigator, Nov. 15, 2004, 3 pages.
Wikipedia—The Free Encyclopedia, "Log-structured File System", Sep. 19, 2005, http://en.wikipedia.org/wiki/Log-structured_File.System, 2 pages.

* cited by examiner

*Primary Examiner* — Andrew Q Tran
(74) *Attorney, Agent, or Firm* — Blakely, Sokoloff, Taylor & Zafman LLP (57) ABSTRACT

Just-in-time segment cleaning obtains the location of blocks of a storage system predicted to be targeted by a future write operation and cleans the blocks targeted for the future write operation prior to the occurrence of the future write operation. In one aspect, just-in-time segment cleaning is performed in proportion to previous user-initiated write operations. In another aspect, just-in-time segment cleaning applies a cost analysis determination to minimize the work of cleaning.

26 Claims, 4 Drawing Sheets

JUST-IN-TIME CONTINUOUS SEGMENT CLEANING

FIELD OF THE INVENTION

At least one embodiment of the present invention pertains to data storage systems, and more particularly, to strategic defragmentation of free space to clean segments predicted to be the target of a future write operation.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2008, NetApp, Inc., All Rights Reserved.

BACKGROUND

Various forms of network-based storage systems exist today. These forms include network attached storage (NAS), storage area networks (SANs), and others. Network storage systems are commonly used for a variety of purposes, such as providing multiple users with access to shared data, backing up critical data (e.g., by data mirroring), etc.

A network-based storage system typically includes at least one storage server, which is a processing system configured to store and retrieve data on behalf of one or more client processing systems ("clients"). In the context of NAS, a storage server may be a file server, which is sometimes called a "filer". A filer operates on behalf of one or more clients to store and manage shared files. The files may be stored in a storage system that includes one or more arrays of mass storage devices, such as magnetic or optical disks or tapes, by using a storage scheme such as Redundant Array of Inexpensive Disks ("RAID"). Additionally, the mass storage devices in each array may be organized into one or more separate RAID groups.

In a SAN context, a storage server provides clients with block-level access to stored data, rather than file-level access. Some storage servers are capable of providing clients with both file-level access and block-level access, such as certain filers made by Network Appliance, Inc. (NetApp) of Sunnyvale, Calif.

A storage server typically includes one or more file systems. A file system, as the term is used here, is a structured (e.g. hierarchical) set of stored data, such as files, directories and/or other types of data containers. As a file system ages and services client-initiated write requests, data and free space tend to become fragmented, a process that accelerates as the amount of free space decreases. Fragmentation occurs when free space within storage is divided into many small pieces over time because regions of storage of varying sizes are continuously allocated and deallocated. Subsequent allocations attempt to fill the "holes" left behind by the deallocated regions, which are interspersed throughout the storage space. As a result, read and write performance tend to degrade over time because data gets divided into non-contiguous pieces in order to fill the "holes."

Moving (relocating) data on disk, a process known as "segment cleaning" alleviates fragmentation of free space within a disk. Nonetheless, segment cleaning can be expensive from a performance standpoint. Reads of existing data on disk in preparation for relocation as well as the relocation of the data may compete with the servicing of client requests, discouraging segment cleaning in heavily-loaded systems that would most benefit from it.

SUMMARY OF THE INVENTION

Just-in-time segment cleaning obtains the location of blocks of a storage system predicted to be targeted by a future write operation and cleans the blocks targeted for the future write operation prior to the occurrence of the future write operation. In one aspect, just-in-time segment cleaning is performed in proportion to previous user-initiated write operations. In another aspect, just-in-time segment cleaning applies a cost analysis determination to minimize the work of cleaning.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims. References in this specification to "an embodiment", "one embodiment", or the like, mean that the particular feature, structure or characteristic being described is included in at least one embodiment of the present invention. However, occurrences of such phrases in this specification do not necessarily all refer to the same embodiment.

Just-in-time segment cleaning minimizes the resource cost of segment cleaning by cleaning only the segments that will likely be used in the near future, striking a balance between cleaning and the storage workload by cleaning enough segments to prevent delay in writing to "dirty" segments without cleaning so many segments as to cause a delay in waiting for the cleaning to complete, and by using the cost of cleaning as compared to writing to "dirty" segments to strategically clean only cost efficient segments.

In one embodiment, just-in-time segment cleaning includes obtaining the location of blocks of a storage system predicted to be targeted by a future write operation and cleaning the blocks targeted for the future write operation prior to the occurrence of the future write operation. The prediction of which blocks will be targeted by a future write operation is made using the location and number of data blocks targeted by a current write operation. In one embodiment, segment cleaning is performed in proportion to one or more of previous and current write operations. In one embodiment, just-in-time segment cleaning applies a cost analysis determination to minimize the work of cleaning by cleaning only those segments that would require fewer resources to clean than the resources required to write to the segments without cleaning them. In one embodiment, just-in-time segment cleaning is implemented within a file system in which segment cleaning is optional.

Figure 1:
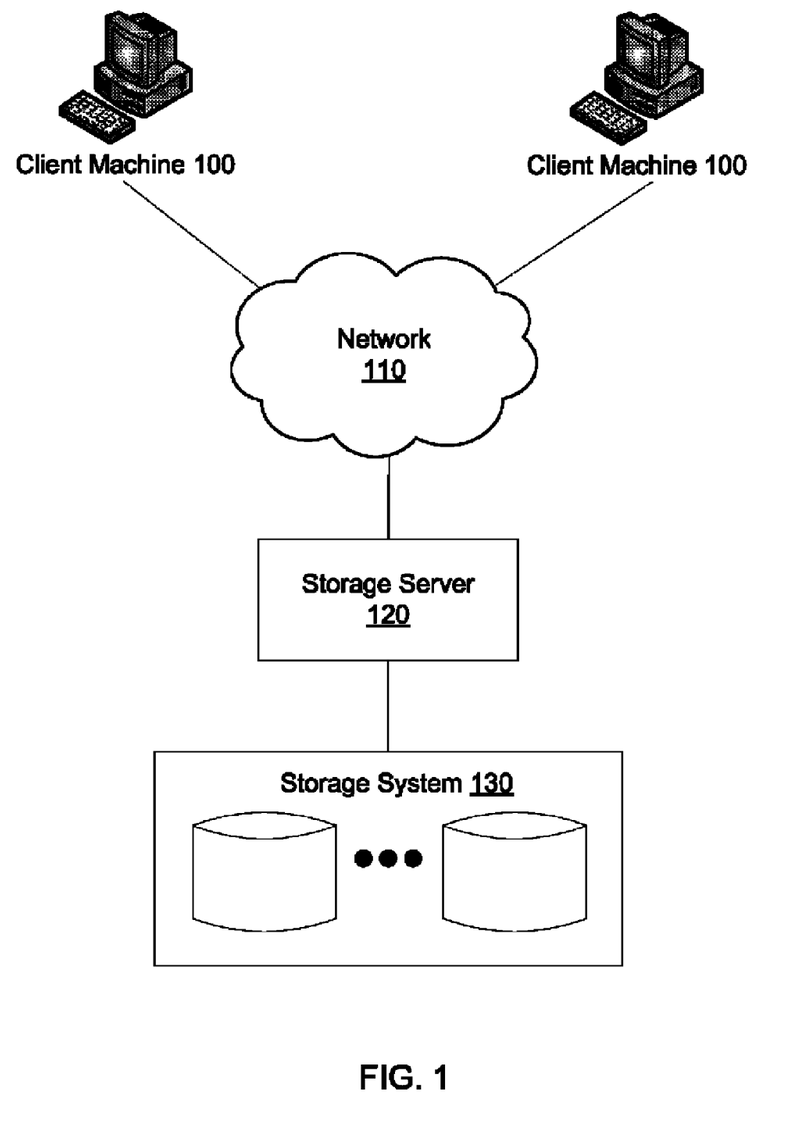
FIG. 1 illustrates a storage network environment, which includes a storage server in which just-in-time segment cleaning may be implemented.

FIG. 1 shows an exemplary network environment that incorporates a storage server 120, in which just-in-time segment cleaning can be implemented. In addition, embodiments can be adapted for use in other types of storage systems, such as storage servers that provide clients with block-level access to stored data as well as processing systems other than storage servers.

The storage server 120 is coupled to a set of client machines 100 (hereinafter "clients") through a network 110. The network 110 may be, for example, a local area network (LAN), a wide area network (WAN), a global area network (GAN) such as the Internet, a Fibre Channel fabric, or a combination of such networks. Each of the clients 100 may be, for example, a conventional personal computer (PC), server-class computer, workstation, or the like.

The storage server 120 is also coupled to a storage system 130, which includes a set of mass storage devices. The mass storage devices in the storage system 130 may be, for example, conventional magnetic disks, solid-state disks (SSD), magneto-optical (MO) storage, or any other type of non-volatile storage devices suitable for storing large quantities of data.

The storage server 120 manages the storage system 130, for example, by receiving and responding to various read and write requests from the client(s) 100, directed to data stored in or to be stored in the storage system 130. Implementing just-in-time segment cleaning, the storage server 120 determines the location and number of segments within the storage system 130 required for a current write request from the client(s) 100, and predicts the location and number of segments within the storage system 130 to be targeted by a future write operation. Using that prediction, the storage server 120 performs segment cleaning of the predicted segments within the storage system 130 prior to a subsequent write request from client(s) 100 that targets the predicted segments within the storage system 130. In one embodiment, the storage server 120 implements a cost analysis determination to clean only cost-efficient segments.

Although illustrated as a self-contained element, the storage server 120 may have a distributed architecture. In this way, all of the storage systems can form a single storage pool, to which any client of any of the storage servers has access.

It will be appreciated that certain embodiments of the present invention may be implemented with solid-state memories including flash storage devices constituting storage system 130. For example, storage system 130 may be operative with non-volatile, solid-state NAND flash devices which are block-oriented devices having good (random) read performance, i.e., read operations to flash devices are substantially faster than write operations. Data stored on a flash device are accessed (e.g., via read and write operations) in units of pages, which in the present embodiment are 4 kB in size, although other page sizes (e.g., 2 kB) may also be used.

When the flash storage devices are organized as one or more parity groups in a RAID array, the data is stored as stripes of blocks within the parity groups, wherein a stripe may constitute similarly located flash pages across the flash devices. For example, a stripe may span a first page 0 on flash device 0, a second page 0 on flash device 1, etc. across the entire parity group with parity being distributed among the pages of the devices. Note that other RAID group arrangements are possible, such as providing a RAID scheme wherein every predetermined (e.g., 8th) block in a file is a parity block.

The following is an overview of one embodiment of the invention. A "block" or "data block," as the term is used herein, is a contiguous set of data of a known length starting at a particular offset value within storage system 130. For certain embodiments of the invention, blocks contain 4 kilobytes of data and/or metadata. In other embodiments, blocks can be of a different size or sizes. A particular number of consecutive blocks across each disk in the storage system 130 is known as a "segment" (e.g., a "stripe" across a RAID group). For one embodiment, a segment contains 128 blocks per data-disk in a RAID. For one embodiment, during segment cleaning, the blocks in a segment are evaluated together, as a segment, and to the extent possible, are moved together. Whether the blocks in a particular segment are good candidates for relocation (i.e., for segment cleaning) can be determined at essentially any time and can be based on, for example, the free space distribution on disk and the incoming sequence of read and write operations.

For one embodiment, "cleaning" refers to moving blocks during a segment cleaning process. In other embodiments, cleaning includes deleting blocks in addition to relocating blocks. In some conventional storage servers, data is stored in logical containers called volumes and aggregates. An "aggregate" is a logical container for a pool of storage, combining one or more physical mass storage devices (e.g., disks) or parts thereof into a single logical storage object, which contains or provides storage for one or more other logical data sets at a higher level of abstraction (e.g., volumes). A "volume" is a set of stored data associated with a collection of mass storage devices, such as disks, which obtains its storage from (i.e., is contained within) an aggregate, and which is managed as an independent administrative unit. A volume includes one or more file systems, such as an active file system and, optionally, one or more persistent point-in-time images of the active file system captured at various instances in time (e.g., a consistency point). A "file system" is an independently managed, self-contained, hierarchal set of data units (e.g., files, blocks, or logical unit numbers). Although a volume or file system (as those terms are used herein) may store data in the form of files, that is not necessarily the case. For example, a volume or file system may store data in the form of other units of data, such as blocks or logical unit numbers ("LUNs").

Segment cleaning involves moving various blocks to new locations in the aggregate (i.e., relocating blocks). Certain blocks may be moved, for segment cleaning purposes (particularly for cleaning free space), during the course of normal read operations by the storage server, such as client-initiated reads, reads for RAID parity computation, etc. More precisely, the blocks are marked as "dirty", i.e. tagged as "to be moved", during a read and are actually moved at the next "consistency point." A consistency point is the recurring event at which any new or modified data that has been temporarily cached in the storage server's memory is committed to long-term storage (e.g., disks). A consistency point typically occurs periodically (e.g., every 10 seconds) or in response to a predetermined condition occurring (e.g., a specified percentage of memory is full of "dirty" data).

A read of a block requires that the block be loaded into main memory in the storage server. Consequently, when a block is moved during a read, the storage system can be immediately updated to reflect a block move, without any additional performance cost. Nonetheless, this approach is not sufficient to adequately clean free space on disk, because not all blocks are read during normal read operations. Alternatively, performing segment cleaning on a larger portion of blocks can be expensive from a performance standpoint. Read operations of existing data on disk in preparation for relocation may compete with the servicing of client requests, discouraging relocation in heavily-loaded systems that would most benefit from it.

Therefore, according to one embodiment, blocks are moved independently of normal reads, i.e., during a segment cleaning process, to clean free space on disk as it is needed for write operations.

Figure 2:
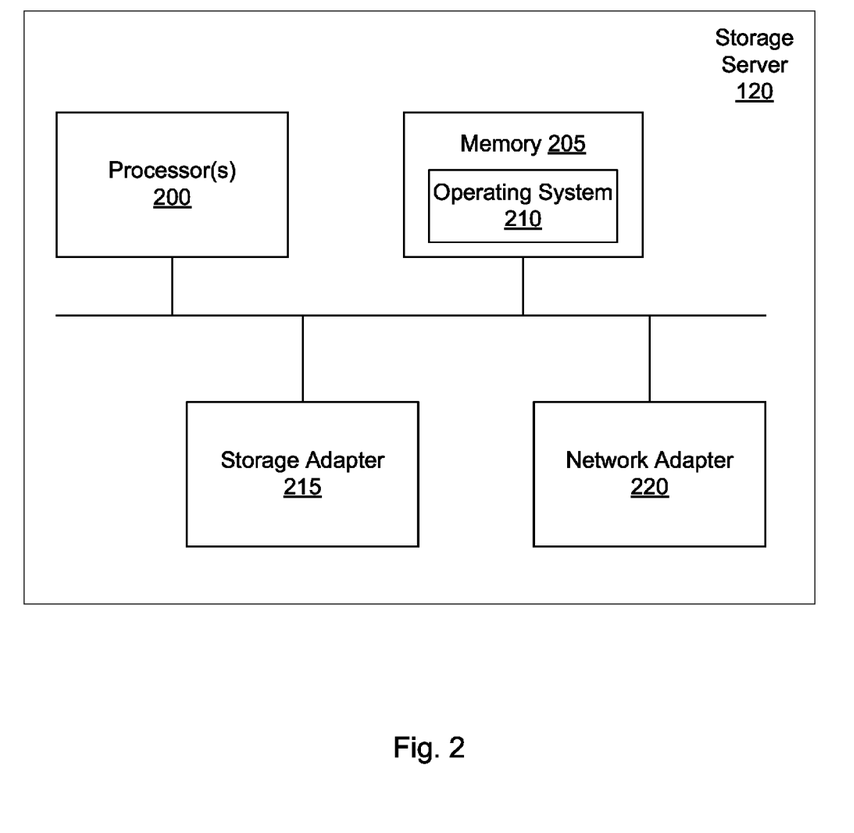
FIG. 2 shows an example of the hardware architecture of the storage server in which just-in-time segment cleaning may be implemented.

FIG. 2 is a block diagram showing an example of the architecture of the storage server 120 at a high level. Certain standard and well-known components, which are not germane to the present invention, are not shown. The storage server 120 includes one or more processors 200 and memory 205 coupled to a bus system. The bus system shown in FIG. 2 is an abstraction that represents any one or more separate physical buses and/or point-to-point connections, connected by appropriate bridges, adapters and/or controllers.

The processors 200 are the central processing units (CPUs) of the file server 120 and, thus, control its overall operation. The processors 200 accomplish this by executing software stored in memory 205.

The memory 205 includes the main memory of the file server 120. The memory 205 stores, among other things, the storage server's operating system 210, which, according to one embodiment, can implement just-in-time segment cleaning as described herein.

Also connected to the processors 200 through the bus system are a storage adapter 215 and a network adapter 220. The storage adapter 215 allows the file server 120 to access the storage system 130. The network adapter 220 provides the file server 120 with the ability to communicate with remote devices, such as the clients 100, over a network.

Figure 3:
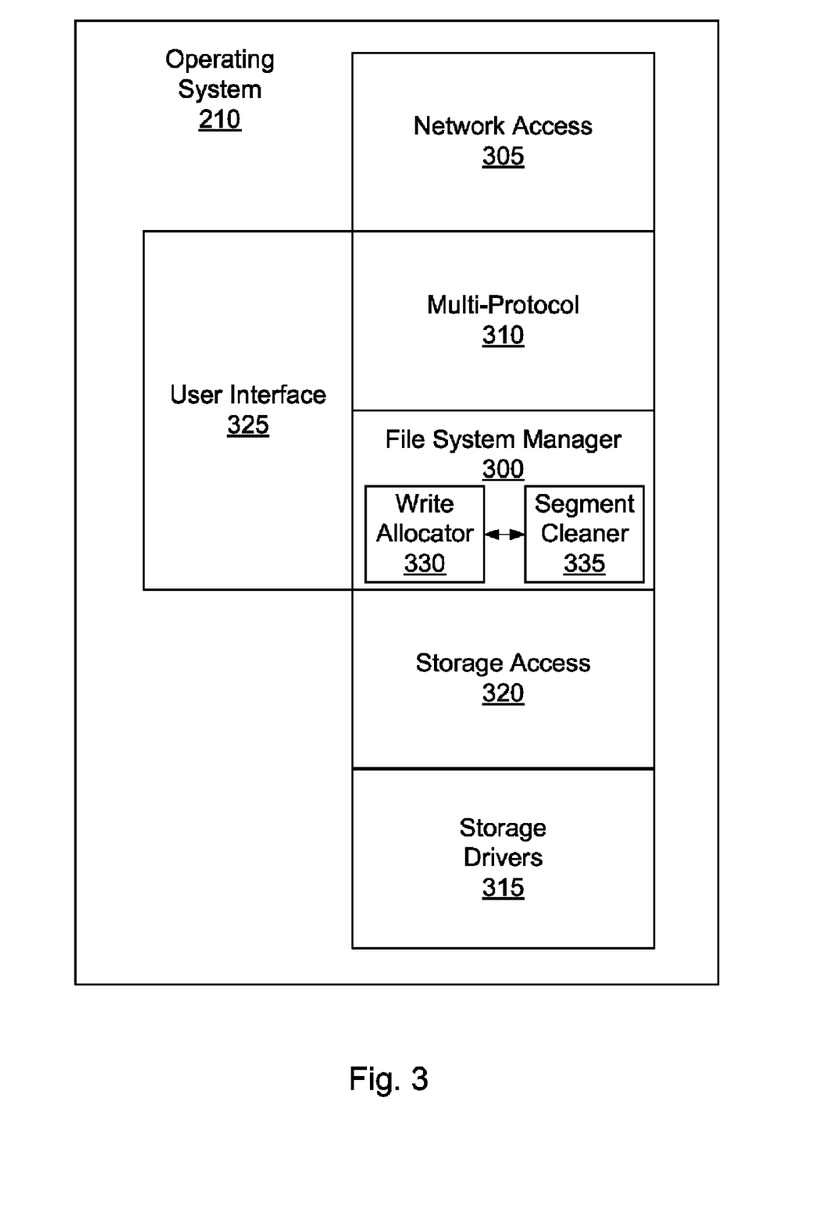
FIG. 3 illustrates the architecture of the operating system of the storage server in which just-in-time segment cleaning may be implemented.

FIG. 3 is a block diagram showing an example of the architecture of the operating system 210 at a high level. Certain standard and well-known components, which are not germane to the present invention, are not shown. For one embodiment, the operating system 210 and its constituent elements are implemented in the form of software (e.g., stored on a machine-readable storage medium). For alternative embodiments, some or all of the elements of the operating system may be implemented in the form of hardware (e.g., specially designed circuitry), or as a combination of hardware and software.

As shown, the operating system 210 includes several modules, or "layers." These layers include a file system manager 300. The file system manager 300 manages the one or more file systems within storage system 130. In particular, the file system manager 300 uses an organizational hierarchy (e.g., a directory/file structure) on the data stored in the storage system 130 and manages client-initiated read and write operations at a high level while delegating certain functions to lower layers of the operation system 210.

To allow the storage server 120 to communicate over the network 110 (e.g., with clients 100), the operating system 210 also includes a network access layer 305, and a multi-protocol layer 310 operatively coupled between the file system manager 300 and the network access layer 305. The multi-protocol layer 310 implements a number of higher-level network protocols. The network access layer 305 includes one or more drivers that implement one or more lower-level protocols to communicate over the network.

To enable the storage server 120 to communicate with the storage system 130, the operating system 210 includes a storage driver layer 315, and a storage access layer 320 operatively coupled between the file system manager 300 and the storage driver layer 315. The storage access layer 320 implements a higher-level disk storage protocol while the storage driver layer 315 implements a lower-level storage device access protocol.

For one embodiment, the operating system 210 also includes a user interface 325 to generate a command line interface and/or graphical user interface, to allow administrative control and configuration of the storage server 120, from a local or remote terminal.

The file system manager 300 also includes a write allocator 330 and a segment cleaner 335. The write allocator 330 is responsible for determining an appropriate storage destination whenever a block is written. This may be done in response to, for example, a client-initiated write request, a RAID parity recomputation, or a segment cleaning process. The segment cleaner 335 is responsible for determining which segments (groups of contiguous disk blocks) to move during segment cleaning, as described further below. Accordingly, the segment cleaner 335 provides information on its determinations to the write allocator 330, which decides where to place the relocated blocks.

Figure 4:
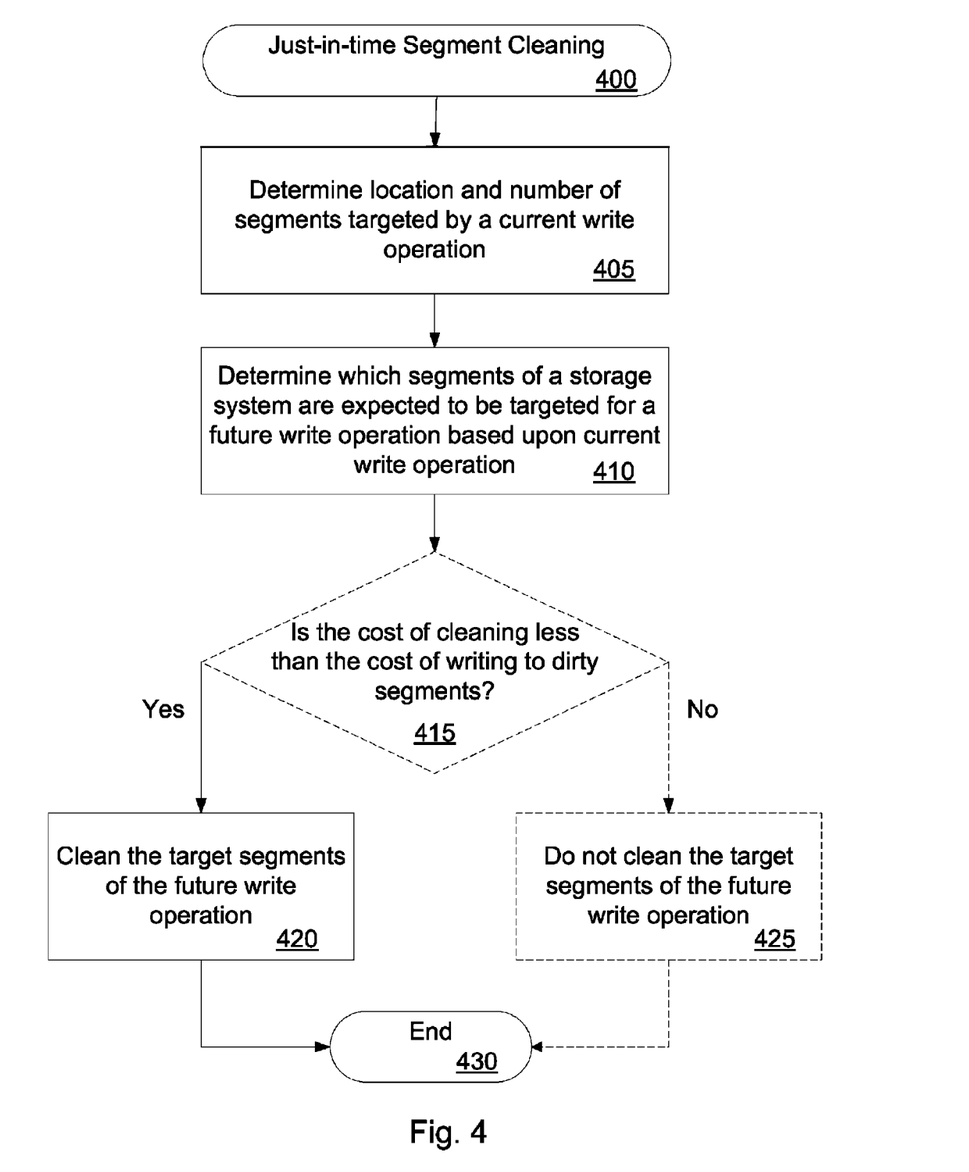
FIG. 4 shows an exemplary flow chart for a method for just-in-time segment cleaning.

FIG. 4, illustrates an exemplary method 400 that is executed by the segment cleaner 335 for performing just-in-time segment cleaning. At block 405, the method 400 determines the location and number of segments targeted by a current write operation via its connection with the write allocator 330. The write allocator 330 targets a plurality of blocks, e.g., one or more segments, for a write operation, e.g., during a consistency point. The write allocator 330 determines the areas of the storage system 130 to which the storage server 120 writes. According to one embodiment, the segment cleaner 335 receives the number and location of segments targeted by a current write operation directly from the write allocator 330 by request or default. In an alternative embodiment, the segment cleaner 335 obtains the number and location of segments targeted by a current write operation by snooping the determinations or output of write allocator 330. For one embodiment, a group of blocks is targeted for a write operation based on the ratio of used blocks to free blocks (the "utilization"). Each time the write allocator 330 targets blocks for a write operation, the segment cleaner 335 tracks the location of the blocks to be written and the number of blocks to be written as a list, e.g., in an array or other storage data structure.

At block 410, the method 400 selects one or more segments within the storage system 130 that are expected to be targeted for a future write operation based on the location and number of blocks targeted by the current write operation. For example, during the execution of a write operation, the segment cleaner 335 makes a list of target segments to clean in anticipation of a future write operation. The segment cleaner 335 makes the list of target segments to clean using one or more of the determinations made by the write allocator 330 to target blocks for write allocations. Using the targeting determination made by the write allocator 330, the segment cleaner 335 advances the location of blocks within the storage system 130 ahead in the current path of the write allocator 330 in proportion to the amount of blocks targeted by the current write operation. For one embodiment, the target blocks of a future write operation are at least two write operations ahead of the current write operation. For example, if the current write operation targets 10 blocks, the segment cleaner 335 will target at least 20 blocks ahead of the first block of the current write operation. In an alternative embodiment, the target blocks of a future write operation are one write operation ahead of the current write operation. In another embodiment, a constant may be added or multiplied to the number of blocks targeted by the current write operation prior to determining the target blocks of a future write operation.

For one embodiment, an average number or sum total of blocks written in a current write operation and one or more previous write operations is used to determine the location of a future write operation. For an average number, the location of a future write operation is determined by multiplying the average number by a number of write operations the target is ahead of the current write operation. Alternatively, if the sum total is determined for a number of write operations, e.g., the current write operation and one or more previous write operations, the location of a future write operation is determined by adding the sum total to the location of the current write operation.

For one embodiment, segment cleaning is performed in proportion to one or more of previous and current write operations. For example, the segment cleaner 335 selects an amount of blocks to be cleaned in the future target area based upon the amount of blocks targeted by the current write operation as described above. For an alternative embodiment, the segment cleaner 335 uses an average of the number of blocks targeted by a number of recent write allocations to determine the location and number of blocks to target for cleaning.

For one embodiment, when the write operation has completed, the segment cleaner 335, in cooperation with write allocator 330, processes the list of blocks targeted for cleaning and cleans as many blocks as possible in the list prior to the next write operation at block 420. As embodiments use past write load as a predictor of short-term future write load, the segment cleaner 335 can be aggressive in cleaning all of the blocks in the list. Cleaning fewer blocks may cause write operations to be delayed because of the lack of clean segments. Cleaning more blocks may cause user writes to be delayed while waiting for the cleaning to complete. For one embodiment, when the next write operation occurs, the segment cleaner 335 may discard the old list and start building a new one. In an alternative embodiment, the segment cleaner 335 may add target blocks to an existing list. For one embodiment, a predetermined threshold limits the number of target blocks kept within the list of blocks to be cleaned.

In addition to using past write load as an indication of the number of blocks to clean, at block 415, the method 400 optionally evaluates the cost of cleaning blocks within a targeted area. One embodiment of calculating this cost is described below. At block 415, the cost of cleaning each of the segments is compared against the cost of writing without cleaning (the determination of the cost of writing without cleaning is described below). If the cost of cleaning is less the cost of writing to an unclean segment, the segment cleaner 335 cleans the targeted segment at block 420. If the cost of cleaning is not less than the cost of writing to unclean segment, the segment cleaner 335 does not clean the targeted segment at block 425. Once the entire list of target segments has been processed, a predetermined time has expired, or other threshold has been reached, the process ends at block 430. The process may then begin again at 400, cleaning for a sequential future write operation.

For one embodiment, the segment cleaner 335 will compute a score based on one or more of the following: the cost for computing parity for a hypothetical write based on the existing arrangement of blocks in each segment (or "stripe" across a RAID group), the cost for writing I/O chains for a hypothetical write based on the existing arrangement of blocks in each chain (e.g., within a single disk in a RAID group), and the percentage of current storage which has already been cleaned. For example, these costs may be evaluated in one or more of the following ways: computing time, resources required, the number of reads required, number of writes required, etc. For one embodiment just-in-time segment cleaning is not performed if the cost of cleaning and writing is greater than the cost of writing without cleaning. For an alternate embodiment, the number of blocks to be cleaned by just-in-time segment cleaning is reduced if the cost of cleaning and writing is greater than the cost of writing without cleaning.

For one embodiment, just-in-time segment cleaning is performed only if the percentage of current storage space which has already been cleaned is less than a threshold amount.

For one embodiment, just-in-time segment cleaning calculates the number of reads for each of the two scenarios of writing with or without segment cleaning and performs segment cleaning if writing to the one or more segments after segment cleaning will result in less reads than not performing segment cleaning. For example, if one or more segments are fragmented, the write allocator would fill the available, fragmented free space with new data. As a result, the system will issue a number of read operations of the existing data for parity computation and a number of write operations for both the new data being written and the new parity information. In contrast, if segment cleaning is performed prior to the write allocation, a portion of the existing data is read and written to relocate the existing data, and a number of write operations are performed for the new data. Parity read operations are not performed if segment cleaning is performed prior to write allocation. Just-in-time segment cleaning is performed if writing to the one or more segments after segment cleaning will result in less reads than not performing segment cleaning.

Thus, just-in-time segment cleaning performs defragmentation in a storage system as described herein. In practice, the method 400 may constitute one or more programs made up of computer-executable instructions. The computer-executable instructions may be written in a computer programming language, e.g., software, or may be embodied in firmware logic or in hardware circuitry. The computer-executable instructions to implement just-in-time segment cleaning may be stored on a machine-readable storage medium. A "machine-readable storage medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). One of skill in the art will immediately recognize that the terms "machine-readable storage medium" and "computer-readable storage medium" include any type of volatile or non-volatile storage device that is accessible by a processor. For example, a machine-readable storage medium includes recordable/non-recordable media (e.g., read-only memory (ROM); random access memory (RAM); magnetic disk storage media; optical storage media; flash memory devices; etc.).

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computerized method of segment cleaning comprising:
   obtaining, by a storage server, a location of blocks of a storage system predicted to be targeted by a future write operation, wherein the predicting uses a location and number of data blocks targeted by a current write operation to indicate which data blocks will be targeted by the future write operation, wherein the future write operation is at least two write operations ahead of the current write operation; and
   cleaning the data blocks targeted for the future write operation prior to the occurrence of the future write operation.

2. The method of claim 1, wherein the number of data blocks cleaned is equal to the number of data blocks written in the current write operation.

3. The method of claim 1, wherein the predicting includes determining a number of write operations the future write operation is ahead of the current write operation and multiplying the number of write operations by the number of blocks targeted by the current write operation.

4. The method of claim 1, wherein the predicting includes using an average number or sum total of blocks written in the current write operation and a previous write operation to determine the location of the future write operation.

5. The method of claim 1, further comprising:
   comparing a cost of cleaning a plurality of data blocks predicted to be targeted by the future write operation against a cost of writing to the plurality of data blocks without cleaning; and
   reducing the number of data blocks to be cleaned if the cost of cleaning the plurality of data blocks is greater than the cost of writing to the plurality of data blocks without cleaning.

6. The method of claim 5, wherein the cost of cleaning uses one or more factors from a group consisting of:
   a number of reads required for computing parity for a hypothetical write based on the arrangement of data blocks in each segment,
   a cost for writing I/O chains for a hypothetical write based on the arrangement of data blocks in each chain, and
   a percentage of the storage system already cleaned compared against a threshold percentage.

7. The method of claim 5, wherein comparing the cost of cleaning against the cost of writing includes comparing one of computing time, a number of reads required, and a number of writes required.

8. The method of claim 1, wherein a write operation occurs during a consistency point.

9. A computerized method of segment cleaning comprising:
   obtaining, by a storage server, a location of blocks of a storage system predicted to be targeted by a future write operation, wherein the predicting uses a location and number of data blocks targeted by a current write operation to indicate which data blocks will be targeted by the future write operation;
   comparing, by the storage server, a cost of cleaning a plurality of data blocks predicted to be targeted by the future write operation against a cost of writing to the plurality of data blocks without cleaning, wherein the comparing the costs includes comparing one of computing time, a number of reads required, and a number of writes required;
   reducing, by the storage server, the number of data blocks to be cleaned if the cost of cleaning the plurality of data blocks is greater than the cost of writing to the plurality of data blocks without cleaning; and
   cleaning, by the storage server, the reduced data blocks targeted for the future write operation prior to the occurrence of the future write operation.

10. The method of claim 9, wherein the cost of cleaning uses one or more factors from a group consisting of:
    a number of reads required for computing parity for a hypothetical write based on the arrangement of data blocks in each segment,
    a cost for writing I/O chains for a hypothetical write based on the arrangement of data blocks in each chain, and
    a percentage of the storage system already cleaned compared against a threshold percentage.

11. A server comprising:
    a processor; and
    a memory coupled with the processor and storing instructions which, when executed by the processor, cause the processor to
      obtain the location of blocks of a storage system predicted to be targeted by a future write operation, wherein the predicting uses a location and number of data blocks targeted by a current write operation to indicate which data blocks will be targeted by the future write operation, and
      clean the data blocks targeted for the future write operation prior to the occurrence of the future write operation, wherein the number of data blocks cleaned is equal to the number of data blocks written in the current write operation.

12. The server of claim 11, wherein the future write operation is at least two write operations ahead of the current write operation.

13. The server of claim 11, wherein the predicting includes determining a number of write operations the future write operation is ahead of the current write operation and multiplying the number of write operations by the number of blocks targeted by the current write operation.

14. The server of claim 11, wherein the predicting includes using an average number or sum total of blocks written in the current write operation and a previous write operation to determine the location of the future write operation.

15. The server of claim 11, wherein the instructions which, when executed by the processor, further cause the processor to:
    compare a cost of cleaning a plurality of data blocks against a cost of writing to the plurality of data blocks without cleaning; and
    reduce the number of data blocks to be cleaned if the cost of cleaning the plurality of data blocks is greater than the cost of writing to the plurality of data blocks without cleaning.

16. The server of claim 15, wherein the cost of cleaning uses one or more factors from a group consisting of:
    a number of reads required for computing parity for a hypothetical write based on the arrangement of data blocks in each segment, a cost for writing I/O chains for a hypothetical write based on the arrangement of data blocks in each chain, and a percentage of the storage system already cleaned compared against a threshold percentage.

17. The server of claim 15, wherein comparing the cost of cleaning against the cost of writing includes comparing one of computing time, a number of reads required, and a number of writes required.

18. The server of claim 11, wherein a write operation occurs during a consistency point.

19. A system comprising:

a storage system; and a server coupled to the storage system, the server comprising a processor and a memory, the memory coupled with the processor and storing a set of instructions, wherein the set of instructions cause the server to obtain the location of blocks of the storage system predicted to be targeted by a future write operation, wherein the predicting uses a location and number of data blocks targeted by a current write operation to indicate which data blocks will be targeted by the future write operation, compare a cost of cleaning a plurality of the data blocks predicted to be targeted by the future write operation against a cost of writing to the plurality of data blocks without cleaning, reduce the number of data blocks to be cleaned if the cost of cleaning the plurality of data blocks is greater than the cost of writing to the plurality of data blocks without cleaning, and clean the data blocks targeted for the future write operation prior to the occurrence of the future write operation.

20. The system of claim 19, wherein the future write operation is at least two write operations ahead of the current write operation.

21. The system of claim 19, wherein the number of data blocks cleaned is equal to the number of data blocks written in the current write operation.

22. The system of claim 19, wherein the predicting includes determining a number of write operations the future write operation is ahead of the current write operation and multiplying the number of write operations by the number of blocks targeted by the current write operation.

23. The system of claim 19, wherein the predicting includes using an average number or sum total of blocks written in the current write operation and a previous write operation to determine the location of the future write operation.

24. The system of claim 19, wherein the cost of cleaning uses one or more factors from a group consisting of:

a number of reads required for computing parity for a hypothetical write based on the arrangement of data blocks in each segment, a cost for writing I/O chains for a hypothetical write based on the arrangement of data blocks in each chain, and a percentage of the storage system already cleaned compared against a threshold percentage.

25. The system of claim 19, wherein comparing the cost of cleaning against the cost of writing includes comparing one of computing time, a number of reads required, and a number of writes required.

26. The system of claim 19, wherein a write operation occurs during a consistency point.

* * * * *